United States Patent [19]
Kjorling

[11] Patent Number: 4,971,482
[45] Date of Patent: Nov. 20, 1990

[54] PNEUMATIC SYSTEM AND METHOD FOR CONVEYING OF SAND

[76] Inventor: Peter Kjorling, Canal Pl. Ste. 2320, New Orleans, La. 70130

[21] Appl. No.: 279,212

[22] Filed: Dec. 2, 1988

[51] Int. Cl.[5] .............................................. B65G 53/36
[52] U.S. Cl. .................................... 406/124; 406/137; 406/141; 406/142
[58] Field of Search ............... 406/153, 109, 137, 136, 406/138, 141, 142, 146, 124, 163, 191, 174, 197; 51/263, 436

[56] References Cited

U.S. PATENT DOCUMENTS

| | | | |
|---|---|---|---|
| 2,684,928 | 7/1954 | Berg | 406/142 |
| 2,686,083 | 8/1954 | Hampton et al. | 406/141 |
| 4,502,819 | 3/1985 | Fujii et al. | 406/142 |
| 4,662,799 | 5/1987 | Paul et al. | 406/142 |

*Primary Examiner*—Joseph F. Peters, Jr.
*Assistant Examiner*—Anne Sartelle
*Attorney, Agent, or Firm*—Keaty and Keaty

[57] ABSTRACT

The present invention relates to a system and method for conveying sand at offshore locations with the assistance of compressed air. The sand is transferred from sand storage tanks positioned on a vessel to a sand aeration vessel under pressure and when needed is transferred, by low pressure air, through a conveying conduit to its destination.

30 Claims, 4 Drawing Sheets

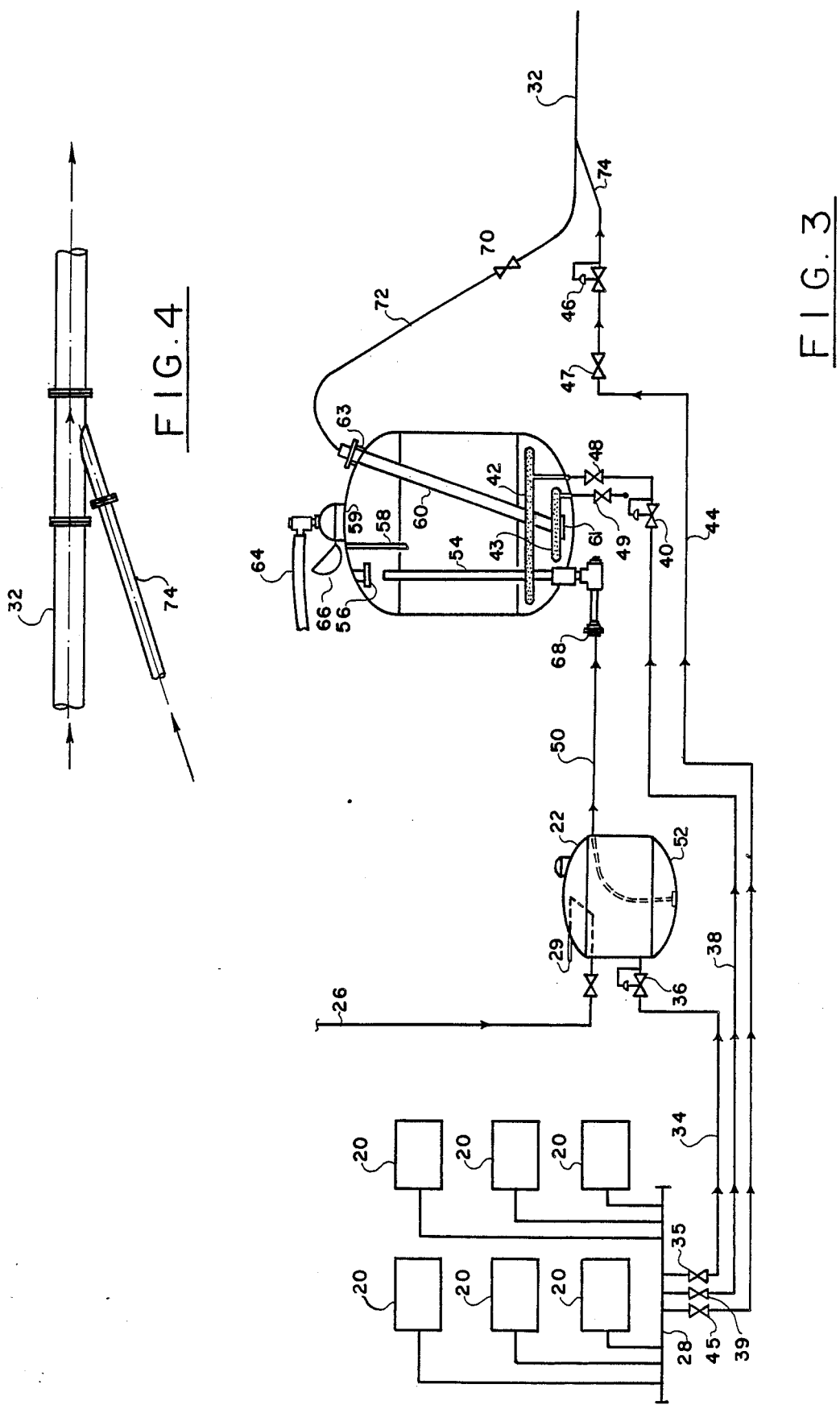

PNEUMATIC SYSTEM AND METHOD FOR CONVEYING OF SAND

BACKGROUND OF THE INVENTION

The present invention relates to a system and method for conveying of sand, and more specifically to a system of conveying sand at offshore locations with the assistance of motive air.

In the offshore industry, wherein metal structures are exposed to highly corrosive environment, there exists a need for sandblasting of patform structures to prevent further corrosion of the metal.

The platform structures, being of considerable dimensions, require large quantities of sand for sandblasting. It is a conventional practice at present to convey sand from a service vessel to a semi-submersible vessel which is positioned for floating at a typical production complex, which may also comprise a number of production platforms requiring continuous maintenance.

The sand delivered to a semi-submersible vessel is manually carried from the vessel by gangways to platforms and deposited into the volume tanks of sandblasting machines, from which it is withdrawn by pressure and delivered to a sandblasting nozzle for a sandblasting operation.

Such manual handling of sand requires not only many hours for accomplishing a single sandblasting operation, but also considerable labor force, which directly translates into loss of profit to the owners of the production complex.

It is, therefore, an object of the present invention to overcome deficiencies and drawbacks of the conventional method of transporting sand from a semi-submersible vessel to a production platform.

It is a further object of the present invention to provide a system for sand conveying which operates on a low air pressure, but still allows large volumes of sand to be transported.

It is still a further object of the present invention to provide a system, wherein erosion of conveying pipes is reduced to a minimum, thus saving on the cost of the sandblasting operation at an offshore location.

It is still a further object of the present invention to provide a novel apparatus for conveying of sand from a semi-submersible vessel to a plurality of production platforms.

These and other objects of the present invention will be more apparent to those skilled in the art from the following description of the invention.

SUMMARY OF THE INVENTION

The present invention overcomes shortcomings of the prior art and achieves its objects in a simple and straightforward manner. The system provides for the use of a storage tank positioned on a semi-submersible vessel in fluid communication with a sand aeration vessel, both of which are independently connected to a source of compressed air. A sand conveying conduit stretching between the semi-submersible vessel and a platform or a plurality of platforms is in fluid communication with the sand aeration vessel and independently with the source of compressed air. The sand is delivered to the storage vessels on the semi-submersible vessel by conventional means and is transferred under pressure to the sand aeration tank, while air supply to the sand conveying conduit is disconnected.

Once the contents of the sand aeration vessel which settled by gravity in the vessel are needed on a platform, the air communication between the compressed air source and the sand conveying conduit is opened, injecting the air into the conveying conduit. Sand is withdrawn, upon demand from the sand aeration vessel, with of the assistance of the compressed air admitted into the aeration vessel to aerate and pressurize the contents of the vessel and force the sand-air mixture from the vessel into the conveying conduit, wherein it is assisted in movement by the air initially admitted into the conveying conduit.

The sand is conveyed at low pressure from the sand storage tank to the aeration vessel, and at a low, although slightly increased pressure from the aeration vessel through the conveying conduit. To prevent abrasion of the conduits through which the sand is transmitted, flexible, deformable pipes made of polyethylene are utilized, with the pipes being bent, as required, to a predetermined radius to prolong useful life of the pipeline. The aeration vessel comprises a sand delivery conduit which communicates with the bottom of the vessel and extends substantially vertically to the top of the vessel, forcing the sand and mixture from its outlet adjacent a top of the vessel. At least one annular aerator pipe is positioned adjacent the bottom of the vessel in fluid communication with the source of compressed air. An angularly secured in the aeration vessel sand discharge conduit has its inlet adjacent a bottom of the vessel and its outlet connected to the sand conveying line at the top of the vessel. A centrally located ventillation opening allows venting of excess air into the atmosphere during filling cycle of the aeration vessel. During transfer operation, the ventillation opening is closed to allow pressurization of the contents of the aeration vessel. In some of the embodiments, the aerator means within the aeration vessel comprise a pair of vertically spaced aerator pipes, each independently connected to the source of the compressed air. To prevent the sand from entering the ventiallation opening, a baffle plate extends from the top of the vessel to a distance at least slightly below the outlet of the sand delivery conduit in substantially parallel relationship thereto. By conveying sand, upon demand of the aeration vessel positioned on a semi-submersible to the platform, wherein said blasting machines are mounted, the sandblasting operation can be performed efficiently, with the minimum time required for filling the tank of the sandblasting machine and with considerable savings in the entire cost of production complex operation.

BRIEF DESCRIPTION OF THE DRAWINGS

FIG. 3 is a schematic view of a method and an apparatus for conveying sand in accordance with the present invention.

FIG. 4 is a detail view of an air injection pipe connected to a sand conveying pipe.

DETAILED DESCRIPTION OF THE PREFERRED EMBODIMENT

Figure 1:
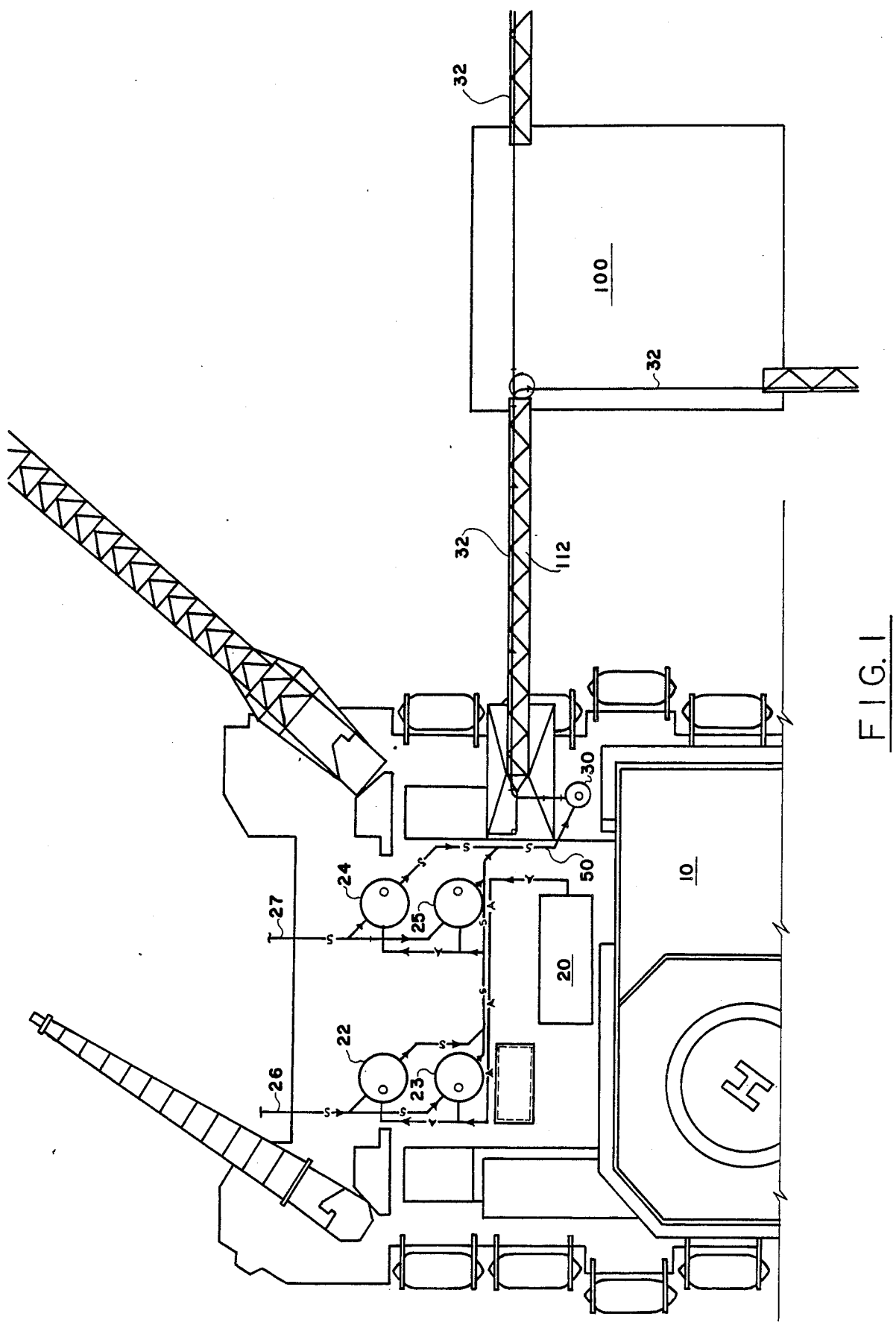
FIG. 1 is a plan view of the system of the present invention employed at a production complex.
Figure 2:
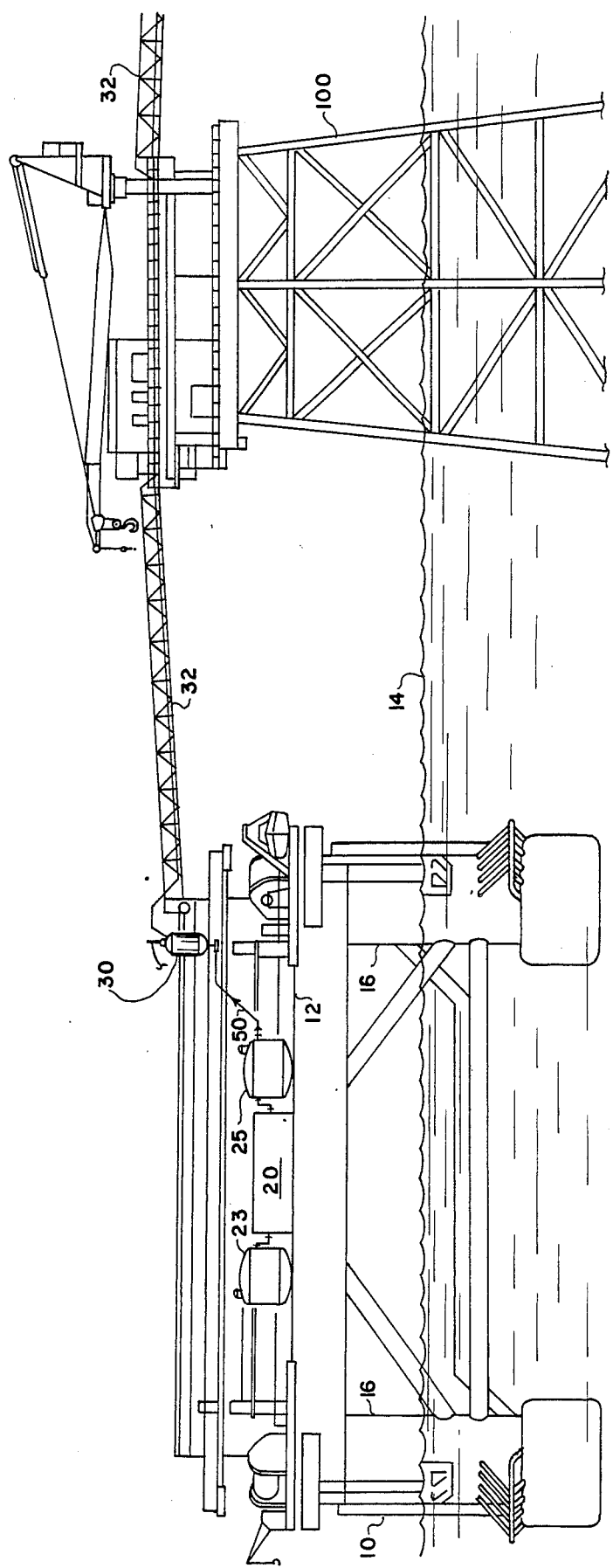
FIG. 2 is an elevational schematic view of the system of the present application employed at the production complex.
Figure 5:
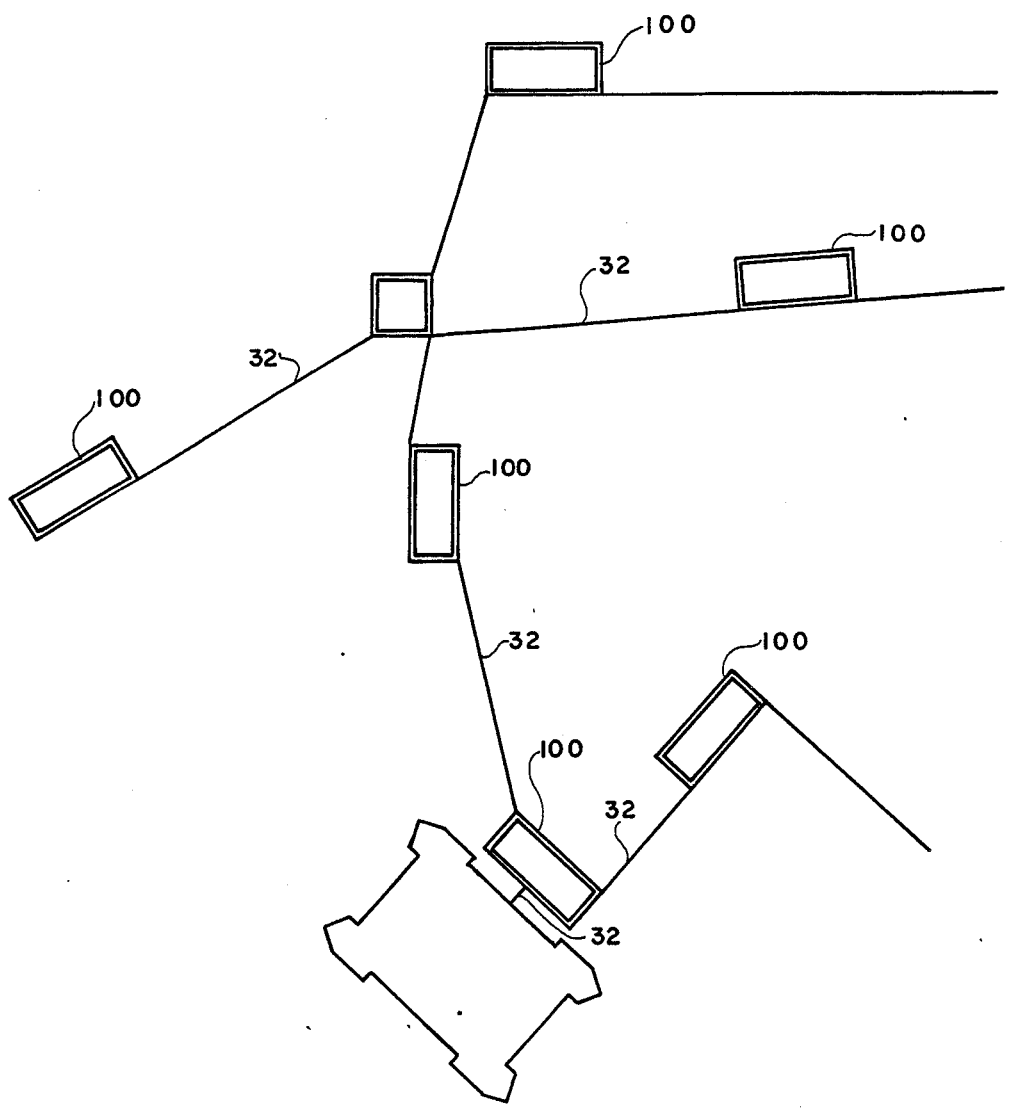
FIG. 5 is a schematic view of a production complex with sand transfer lines.

Reference will now be made to the drawings, wherein like numerals designate like parts, and wherein numeral 10 designates a semi-submersible vessel which traditionally has a main deck 12 supported above a sea level 14 by a plurality of columns 16. The semi-submersible vessel 10, being of conventional design, forms no part of the present application.

Mounted on the main deck 12 are air compressors 20 which can be six in number, however the number is determined by the demands of each particular system. The air compressors are capable of producing approximately 825 cubic feet per minute of compressed air. However, this amount is not critical and can be adjusted depending on the needs of a particular location. The air from compressors 20 is directed, as shown by arrows A in FIG. 1 to a plurality of sand storage tanks 22, 23, 24 and 25.

Sand is delivered to the tanks 22 and 23 by a line 26 from a service vessel with the assistance of compressed air. Likewise, sand is delivered to the sand tanks 24 and 25 through the line 27. The sand tanks are interconnected and each have a volume of approximately 1,250 cubic feet.

The air compressors 20 are each connected to a header 28 which delivers air supply to the sand storage tanks 22-25, to an aeration or blow tank 30 and to a discharge sand conveying line 32. Air supply line 34 is in fluid communication with the header 28 connecting the air compressors and the sand tanks 22-25 via valve 35 and a pressure regulator 36, which regulates the pressure delivered to the sand tanks 22-25.

Air supply line 38 is connected through a valve 39 and an air pressure regulator 40 to the sand blow tank 30 for delivery of air into the blow tank 30, and more specifically to annular aerator conduits 42, 43 positioned adjacent a lower portion of the tank 30. An air supply line 44 is connected through valves 45 and 47 and an air pressure regulator 46 to the conduit 32, injecting air into the line 32, as will be explained in more detail hereinafter.

The air introduced into the sand tanks 22-25 aerates and spurges the sand which was delivered and fell by gravitiy from the top of tank 22 to the bottom thereof. An inlet 51 of aerated sand transfer line 50 is positioned adjacent a bottom 52 of the sand tank 22, as can be seen in more detail in FIG. 3. Excess air is vented to the atmosphere through vent line 29. Reference will be made to the sand tank 22, with an understanding that sand tanks 23, 24 and 25 are equipped and function in a manner similar to the sand tank 22. The spurged sand is moved upwardly to the upper portion of the tank 22, which is in fluid communication with the sand transfer line 50. The line 50 is fluidly connected to all sand tanks 22-25 for delivery of the sand/air mixture in sequence, upon depletion of the sand in one of the sand tanks 22-25. Movement of transferred sand is being shown by arrows "S" in FIG. 1.

A blow tank 30 is positioned at an elevated level in relation to the sand tanks 22-25 in order to bring it closer to a level of gangway 112, along which the sand is delivered to the platform 100. A sand delivery conduit 54 enters the sand aeration tank 30 from the bottom thereof and extends substantially vertically upwardly up to adjacent a top portion of the tank 30.

Fixedly attached to the top portion of the tank 30 is a target plate 56, which directs the sand and air mixture delivered under pressure into the tank 30 downwardly, thus preventing it from reaching the wall of the tank or the top of the tank 30.

Descending from the top portion of the tank 30 in substantially parallel axial relationship to the conduit 54 is a baffle plate 58, descending to a distance below a sand outlet level of the conduit 54. The baffle 58 prevents sand from reaching a centrally located ventilation opening 59 of the tank 30.

Spanning the height of the tank 30 is a sand discharge or conveying pipe 60, which is positioned at an angle in relation to a vertical axis of the tank 30, having its funnel-shaped inlet 61 positioned above the bottom of the tank 30, slightly below an aerator pipe 43, and having its outlet 63 through the top portion of the tank 30.

A first aerator pipe 42 and a second aerator pipe 43, which has a smaller diameter than the aerator pipe 42, are provided with a plurality of circumferentially-spaced apertures, allowing air supply from line 38 to escape into the interior of the tank 30. The aerator pipes 42 and 43 are circular in cross-section and are positioned annularly in the lower portion of the tank 30. The aerator pipes 42 and 43 are connected to the line 38 downstream from the pressure regulator 40 and have their own cutoff valves 48 and 49, respectively.

Centrally located in the upper portion of the tank 30 is a ventillation opening 59, allowing ventilation of the tank 30 during the tank filling operation. The opening 59 is connected to a vent hose 64 and can be disconnected from its fluid communication with the interior of the tank 30 by using a hatch cover 66 which is pivotally movable between an open position, allowing fluid communication between the interior of the tank 30 and hose 64 and a closed position, preventing escape of air from the tank 30, when pressure is built up in the tank 30 during a sand transfer cycle of the operation.

Sand is delivered into the tank 30 upon demand from tanks 22-25, when a sandblasting machine tank requires a new supply of sand.

At that time, a valve 70 in the discharge line 72 is closed, preventing escape of pressure or materials from the tank 30. Sand is transferred at a low pressure, approximately 40-50 psi from the sand tanks 22, 23, 24 or 25 to the blow tank 30 via line 50, travelling upwardly through the pipe 54 and then downwardly by gravity, settling in the tank 30.

During sand transfer cycle, the sand delivery line 50 is disconnected from its fluid communication with the aeration tank 30 through the use of lock cap 68 placed upstream from the conduit 54, outside of the blow tank 30.

Once it is determined that the sand blasting machine tank requires a new supply of sand, the transfer of sand from tank 30 to the sandblasting machine positioned on a platform begins. Pressure regulator 40 and valves 48, 49 are opened, allowing air to enter the tank 30 through the aerator pipes 42 and 43, aerating the sand, creating a "spurging" effect in the tank, such that the sand is in a suspended state within the tank 30, and more specifically adjacent the funnel-shaped inlet 61 in the conveying line 60.

Prior to the opening of the valve 40, air is allowed to enter line 44 to begin injection of air from the compressors to the line 32 through the regulation of valves 45 and 47 by pressure regulator 46. The sand gradually begins to enter the inlet 61, the sand being in a sufficiently aerated state to allow travel upwardly towards the outlet 63. The pressure inside the sand tank 30 at this time may be in the order of 90-150 psi, with a similar pressure in discharge line 72.

Once an area surrounding the inlet 61 has been emptied, new sand, under the force of gravity, lowers down from the upper portion of the tank 30 to the bottom of the tank 30 and enters the inlet 61. This continues until tank 30 is completely empty of the sand. Preferably, the volume of the tank 30 is similar to the volume of the sandblasting machine tank of conventional size.

During sand transfer cycle the hatch 66 is closed to prevent escape of air into the atmosphere and interfere with pressurization of the vessel. During filling cycle of tank 30, the hatch 66 is open.

The sand is assisted in travel along line 32 by initial air introduction through the line 44 and through the air injector connection 74 entering the line 32 downstream from the outlet 63 of the conveying pipe 60. It has been experimentally determined that the air injector line 74 should enter the transfer pipe 32 at about a 20° angle, thus preventing material turbulence at the point of supplemental air injection into the transfer line 32 and preventing sand buildup in the pipe 32.

The system utilizes flexible, deformable plastic pipes for transfer of the sand, which have greater resistance to sand-caused erosion than steel pipes. For example, the use of polyethylene pipes having tensile strength (break) of 4500 psi, flexural modulus of 120,000 psi and tensile strength (yield) of 3,200 psi was found beneficial. Such pipes are manufactured by Quail Pipe Corporation of Texas under grade designation Type III, Grade PE 3408 black pipe. It should be understood, however, that other pipes having similar physical characteristics can be successfully utilized.

Additional advantage of utilizing the plastic pipe is that no welding on site is required for interconnecting segments of pipe to each other.

Further advantage of utilizing plastic pipe is that the previously used steel pipes are difficult to bend to produce curves. The steel pipes are made with right angle connections which are subject to excessive erosion by friction of the sand against the walls of the pipe. With the use of the plastic pipes, various radii curves can be easily accomplished, thus substantially prolonging the lifetime of a pipeling during sand conveying operation in a highly corrosive environment, since larger radius in the pipe curve is subject to less impact by sand moved under pressure.

The sand is delivered through the discharge pipe 32 to a platform 100, and to a tank of a sand blasting machine (not shown) which is of conventional design and is not part of this invention. Lines 32 interconnect the platforms 100 which are spaced at a typical production complex from each other, an example of such complex is shown in FIG. 4. The sand in sand storage tanks 22-25 is kept at a production complex location on a semi-submersible vessel 10 for a certain period of time and is used, when required. Once the supply in the tanks 22-25 is depleted, a new vessel with sand supply approaches the semi-submersible 10 and the sand is conveyed from the sand transfer vessel to the semi-submersible vessel 10 by similar sand conveying lines with the assitance of air pressure to the tanks 22-25, replenishing the supply and filling the tanks 22-25 to capacity.

Other materials, such as for example, concrete or other granulated material, can be successfully transported by the system of the present application.

Many modifications in the design in the system and apparatus of the present invention can be made without departing from the spirit and scope of the present invention. The pressure values can be amended and the values utilized in the present specification are to be understood as exemplary only. The volumes of sand tanks and blow tanks can be changed without affecting the spirit of the present invention.

I, therefore, pray that my rights to the present invention be limited only by the scope of the appended claims.

I claim:

1. An apparatus for conveying of granulated material, comprising:
    a vessel having an upper portion and a lower portion;
    in inlet conduit means inside the vessel for delivery of granulated material into the vessel, said inlet conduit means having an inlet opening at the lower portion of the vessel and extending substantially vertically upwardly with an outlet opening adjacent the top portion of the vessel;
    an outlet conduit means inside the vessel for delivery of granulated material to an exterior of the vessel; and
    means for delivery of pressurized gas into the vessel for aerating the granulated material in the vessel and assisting in moving of the material to the exterior of the vessel.

2. The apparatus of claim 1, wherein said outlet conduit means has an inlet opening adjacent the lower portion of the vessel and extends upwardly at an angle to a vertical axis of the vessel with an outlet opening positioned at the top portion of the vessel.

3. The apparatus of claim 2, wherein said means for delivery of pressurized gas comprise at least one aerator pipe extending about interior periphery of the vessel a distance above a bottom of the vessel.

4. The apparatus of claim 3, wherein said aerator pipe is provided with a plurality of circumferentially-spaced openings allowing pressuring gas to enter the vessel.

5. The apparatus of claim 3, wherein the inlet opening of the outlet conduit means is positioned at a level below the aerator pipe.

6. The apparatus of claim 2, wherein said means for delivery of pressurized gas comprise a pair of vertically spaced-apart aerator pipes extending about interior periphery of the vessel a distance above a bottom of the vessel.

7. The apparatus of claim 1, wherein said vessel is provided with a target plate positioned a distance above the outlet opening of the inlet conduit means to prevent contact of the granulated material delivered under pressure into the vessel with a top of the vessel.

8. The apparatus of claim 1, further comprising a ventillation means centrally located in the upper portion of the vessel.

9. The apparatus of claim 8, further comprising a baffle plate extending downwardly from the top portion of the vessel to a level at least slightly below the outlet opening of the inlet conduit means to prevent the granulated material from entering the ventillation means.

10. The system of claim 1, wherein the sand is conveyed from the sand storage vessel means to the aeration tank means at a pressure level of 42-50 psi.

11. The system of claim 1, wherein the sand is conveyed from sand aeration tank means through said discharge line at a pressure level of 100-psi.

12. The system of claim 1, further comprising sand conveying conduits allowing sand transfer between the sand storage vessel means, aeration tank means and discharge line means, said conduits being made from a substantially flexible, deformable material.

13. The system of claim 12, wherein said conduits are made from polyethylene.

14. A system for conveying of sand comprising:
a means for supplying a pressurized gas;
a sand storage vessel means in fluid communication with the means for supplying a pressurized gas;
a means for supplying of sand to the sand storage vessel means;
a storage vessel outlet means in fluid communication with a sand transfer line for delivery of sand outside of the storage vessel means;
an aeration tank means in fluid communication with the sand transfer line and with the means for supplying of pressurized gas independently from said sand storage vessel means, said aeration tank means comprising a substantially cylindrical vessel having a closed top and a closed bottom; as sand delivery conduit means having its inlet at the bottom of the vessel and extending substantially vertically to a point adjacent the top of the vessel; a sand discharge conduit means having its inlet adjacent the bottom of the vessel and extending upwardly to the top of the vessel; an annular aerator conduit means for aerating contents of the vessel positioned above the bottom of the vessel; means for introducing compressed air to the aerator conduit; a ventilation means centrally located at the top of the vessel for venting the vessel during a vessel sand filling operation; a sand discharge conduit means; and a compressed air injection means for injecting the air into the sand transfer means downstream from the outlet of the sand discharge conduit means;
means for aerating sand delivered into the aeration tank means and moving the sand to a sand discharge line; and
a sand discharge line means in fluid communication with the aeration tank means and independently with the means for supplying a pressurized gas.

15. The system of claim 14, further comprising means for regulating gas pressure in the sand storage vessel means in the aeration tank means and the sand discharge line independently from each other.

16. The system of claim 14, wherein the discharge line is provided with a pressurized gas injection means downstream from an outlet of said aerator tank means to assist in conveying the sand along the discharge line.

17. The apparatus of claim 14, wherein the aerator conduit means comprises at least one aerator pipe having a plurality of circumferentially-spaced openings allowing introduction of compressed air about interior circumference of the vessel.

18. The apparatus of claim 14, wherein said aerator conduit means comprises a pair of vertically-spaced aerator pipes positioned above the inlet of said sand discharge conduit means.

19. The apparatus of claim 18, wherein said means for preventing the sand from entering the ventilation means comprises a baffle means extending from the top of the vessel to a distance at least slightly below an outlet of said sand delivery means in parallel relationship to said sand delivery means.

20. The apparatus of claim 19, wherein said conduit is made of polyethylene.

21. The apparatus of claim 14, further comprising means for preventing the sand from entering the ventilation means.

22. The apparatus of claim 14, wherein said sand transfer means comprises an elongated conduit made of substantially flexible deformable material.

23. An apparatus for conveying of sand between adjacent structures, comprising:
a substantially cylindrical vessel having a closed top and a closed bottom;
a sand delivery conduit means having its inlet at the bottom of the vessel and extending substantially vertically to a piont adjacent the top of the vessel;
a sand discharge conduit means having its inlet adjacent the bottom of the vessel and extending upwardly to the top of the vessel;
an annular aerator conduit means for aerating contents of the vessel positioned above the bottom of the vessel;
means for introducing compressed air to the aerator conduit;
a ventillation means centrally located at the top of vessel for venting the vessel during a vessel sand filling operation;
a sand transfer means in fluid communication with an outlet of the sand discharge conduit means; and
a compressed air injection means for injecting the air into the sand transfer means downstream from said outlet of the sand discharge conduit means.

24. A method of conveying sand between adjacent structures, comprising the steps of:
providing a source of compressed air;
providing a sand storage tank means in fluid communication with the compressed air source;
providing a sand aeration vessel means in fluid communication with the sand storage tank means and with the source of compressed air independently from said sand storage tank means;
providing a sand conveying conduit means in fluid communication with the sand aeration vessel means and an adjacent structure and in fluid communication with the source of compressed air independently from said sand storage tank means and said sand aeration vessel means;
disconnecting air supply to the sand conveying conduit means and to said sand aeration vessel means;
disconnecting fluid communication between said sand storage tank means and said sand aeration vessel means;
depositing a supply of sand into said sand storage tank means;
opening fluid communication between said sand storage tank means and said sand aeration vessel means;
admitting compressed air into said sand storage tank means thus aerating and pressurizing the contents of the sand storage tank means;
transferring a predetermined amount of the pressurized contents of the sand storage tank means to the sand aeration vessel means;
allowing the sand to settle, by gravity, within the sand aeration vessel means;
disconnecting fluid communication between said sand storage tank means and the sand aeration vessel means;
providing annular aeration means within the sand aeration vessel means;
admitting compressed air into said sand conveying conduit means;

admitting compressed air into said annular aeration means, thus aerating and pressurizing contents of the sand aeration vessel means;

opening fluid communication between said sand aeration vessel means and said sand conveying means thus conveying the sand between the adjacent structures with an assistance of air injected into said sand conveying means.

25. The method of claim 24, wherein the sand aeration vessel means comprises:

a substantially cylindrical vessel having a closed top and a closed bottom;

a sand delivery conduit means having its inlet at the bottom of the vessel and extending substantially vertically to a point adjacent the top of the vessel;

a sand discharge conduit means having its inlet adjacent the bottom of the vessel and extending upwardly to the top of the vessel;

an annular aerator conduit means for aerating contents of the vessel positioned above the bottom of the vessel;

means for introducing compressed air to the aertor conduit;

a ventillation means centrally located at the top of vessel for venting the vessel during a vessel sand filling operation;

a sand transfer means in fluid communication with an outlet of the sand discharge conduit means; and a compressed air injection means for injecting the air into the sand transfer means downstream from said outlet of the sand discharge conduit means.

26. The method of claim 25, wherein said aerator conduit means comprises at least one aerator pipe having a plurality of circumferentially-spaced openings allowing introduction of compressed air about interior circumference of the vessel.

27. The method of claim 24, wherein said sand conveying conduit means comprises an elongated pipe made of substantially flexible deformable material.

28. The method of claim 27, wherein said elongated pipe is made of polyethylene.

29. The method of claim 24, wherein the contents of the sand storage tank means are pressurized to approximately 40–50 psi.

30. The method of claim 24, wherein the contents of the sand aeration vessel means are pressurized to about 100–150 psi.

* * * * *